April 23, 1935.  E. M. WEINBERGER  1,998,797
FILTER FOR GREASES AND OILS USED IN COOKING AND FRYING
Filed June 2, 1933
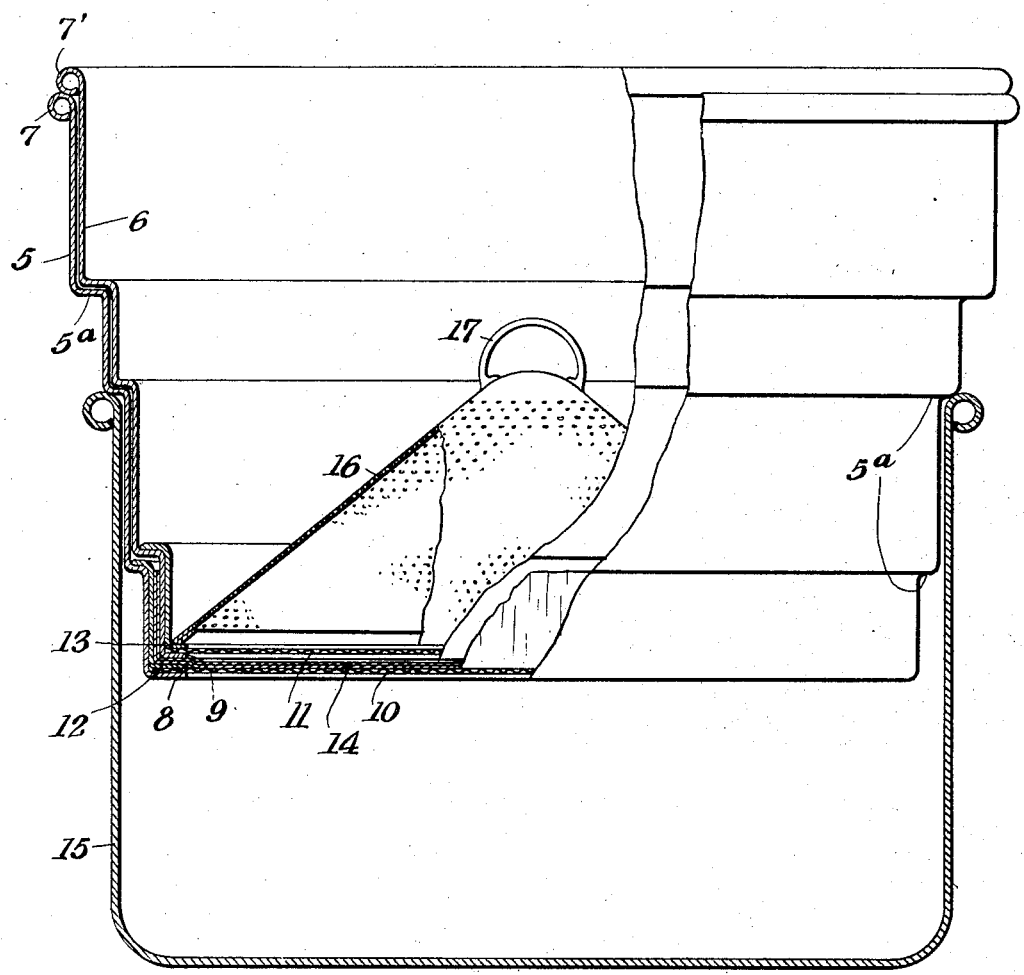
INVENTOR.
EMANUEL M. WEINBERGER
BY
ATTORNEY

UNITED STATES PATENT OFFICE 1,998,797

FILTER FOR GREASES AND OILS USED IN COOKING AND FRYING

Emanuel M. Weinberger, Bronx, N. Y.

Application June 2, 1933, Serial No. 673,999

2 Claims. (Cl. 210—155)

This invention relates to filters for greases and oils used in cooking and frying.

The various greases and oils used in cooking and frying tend to retain the odors of the particular foods on which they were used; a portion of the grease becomes burnt and therefore carbonizes; deleterious gases are generated; and minute flakes of meats, fish, potatoes, etc., usually find their way into the grease. This results, therefore, in evil smelling, injurious flaky grease or oil which is not again suitable for use in frying foods.

Especially in the kitchens of restaurants and hotels, a considerable monetary loss is entailed in discarding greases and oils which have become so contaminated.

Since it is the aim of the cooks and chefs of such establishments to provide savory and delectable foods, in the past it has been necessary to discard used grease to prevent contamination of the foods.

This invention, therefore, contemplates a grease filtering device which is simple and economical in construction; sanitary and practical in use; and which will filter out all odors, carbon and other impurities and undesirable matter from the grease or oil to render it again suitable for use in cooking and frying foods, so that oils and greases so reclaimed may be used exactly like new oils and greases to attain the beautiful, golden brown color so desirable in fried potatoes, fish, meats, etc., and to provide cooked and fried foods which will pass the closest scrutiny, please the most fastidious olfactory organ and satisfy the most exacting epicure.

The invention also contemplates a simple device of this character employing a filter paper having the qualities of filtering foreign odors and extraneous matter from oils and greases used in cooking and frying foods.

The invention also contemplates a device of this kind in which the paper filter is confined between and supported by foraminous plates to prevent undue destructive strains thereon and which is easily removable and replaceable as desired.

Another contemplated feature of the invention resides in the provision of a foraminous member which acts as a strainer for the heavier and larger food particles so the paper filter may not quickly become clogged whereby its efficiency is impaired.

These advantageous features are accomplished by the novel and practical construction, combination and arrangement of parts hereinafter disclosed and illustrated in the accompanying drawing, constituting an essential part of the disclosure, and in which:

The figure is a partial elevational, partial sectional view of a filtering device constructed in accordance with the invention and shown in co-operating assembly with a grease receiving utensil.

Describing the drawing in greater detail, the device comprises an outer stepped receptacle shell 5 and a somewhat similar inner shell 6. Both shells are open at their tops and are provided with top peripheral beads 7 and 7'. Each shell is also formed with an inwardly projecting flange such as 8 and 9 and upon each flange there may be placed a coarse screen of foraminated plate such as indicated at 10 and 11.

Each screen may be retained in position by a ring 12, 13.

In this manner there is provided two somewhat similar shells, one telescopically engageable with-in the other and each provided with a mesh bottom.

A paper filter 14 is now placed so as to be confined between the lower inner portion of the outer shell and the lower outer portion of the inner shell and between the screens 10 and 11.

Practice has taught that a double layer of this special filter paper not only accomplishes the results desired, but is also quite inexpensive. It might here be stated that many attempts have been made to reclaim used oils and greases and several filtering mediums have been tried. All have uniformly failed in attaining proper results because they have not been able to filter out the carbon formed by burnt fats or the injurious oleic acid freed during frying. While the natural formation of these acids cannot be ordinarily prevented, their accumulation in the fats can be reduced by proper filtering. The present invention has discovered that this specially prepared paper has these filtering characteristics.

The device may now be placed so as to partially project into a receiving pot or utensil 15 being supported at one of its ledges 5a upon the top of the utensil.

After use in cooking or frying, the oil or grease is poured into the device and allowed to stand until it percolates through the paper filter.

The paper filter medium may then be removed and replaced by a new one for further use.

Practice has proved that the oils and greases may be used indefinitely if filtered once or twice a day and replenished when evaporation or consumption by the foods makes it necessary.

To further increase the usefulness and efficiency of the device, a strainer in the form of a foraminous conical member 16 may be inserted to overly the paper filter 14. This strainer will intercept the larger particles of extraneous matter and so prevent undue clogging of the filtering medium and shorten the filtering period. A bail such as 17 may be provided to form a means for ready removal of the strainer.

The cone also serves to prevent the sudden inrush of hot oils and fats to the surface of the filter to obviate possible damage to its surface.

From the foregoing it will be seen that a simple device for the purpose has been disclosed in the preferred form of its embodiment, but it is not desired to restrict the details to the exact construction shown, it being obvious that changes, not involving the exercise of invention, may be made without departing from the scope of the appended claims.

Having thus described my invention, what I claim as new and desire to secure by Letters Patent, is:

1. In a filtering device for fats and oils, inner and outer shells telescopically fitted together, the lower end of the inner shell terminating above the lower end of the outer shell, each shell having a series of offset shoulders of progressively increasing diameter, an inwardly extending flange formed on the lower end of each shell, a screen supported on each flange, screen retaining rings fitted in the lower portions of the respective shells to hold the screens on their respective flanges, an outwardly disposed flange formed on the upper edge of each ring and adapted to engage the lowermost shoulder on the respective shells, an inwardly disposed flange formed on the lower edge of each ring for engagement with the upper face of the respective screens, and a paper filter interposed between the aforesaid screens.

2. In a filtering device for fats and oils, inner and outer shells telescopically fitted together, the lower end of the inner shell terminating above the lower end of the outer shell, each shell having a series of offset shoulders of progressively increasing diameter, an inwardly extending flange formed on the lower end of each shell, a screen supported on each flange, screen retaining rings fitted in the lower portions of the respective shells to hold the screens on their respective flanges, an outwardly disposed flange formed on the upper edge of each ring and adapted to engage the lowermost shoulder on the respective shells, an inwardly disposed flange formed on the lower edge of each ring for engagement with the upper face of the respective screens, and a paper filter interposed between the aforesaid screens, and a sheet metal conical strainer resting upon the inwardly disposed flange of the inner retaining ring for disposition over the screens and paper filter.

EMANUEL M. WEINBERGER.